United States Patent

[11] 3,617,434

| [72] | Inventors | Tadashi Nakafuri<br>Hiroshima-ken;<br>Saburo Fukui, Hiroshima-ken; Masao Ono, Hiroshima-ken; Kyoichi Oku, Tokyo; Hiroshi Matsuura, Tokyo; Hitoshi Sotobayashi, Tokyo, all of Japan |
|------|-----------|---|
| [21] | Appl. No. | 732,657 |
| [22] | Filed | May 28, 1968 |
| [45] | Patented | Nov. 2, 1971 |
| [73] | Assignees | Mitsubishi Jukogyo Kabushiki Kaisha;<br>Jujo Paper Co., Ltd.<br>Tokyo, Japan |
| [32] | Priority | May 31, 1967 |
| [33] | | Japan |
| [31] | | 42/34754 |

[54] REGENERATION OF COOKING CHEMICALS FROM SPENT ALKALINE COOKING LIQUOR
4 Claims, 1 Drawing Fig.

[52] U.S. Cl. .................................................. 162/30,
23/48, 23/49, 23/129, 162/33, 162/35, 162/36
[51] Int. Cl. .......................................................... D21c 11/12
[50] Field of Search ........................................... 162/30, 32,
33, 35, 36; 23/48, 49, 129

[56] References Cited
UNITED STATES PATENTS

| 3,248,169 | 4/1966 | Mannbro ...................... | 23/48 |
| 3,392,004 | 7/1968 | Chari et al. .................... | 162/30 X |
| 3,453,174 | 7/1969 | Rapson ......................... | 162/30 |

Primary Examiner—S. Leon Bashore
Assistant Examiner—Arthur L. Corbin
Attorney—McGlew and Toren ABSTRACT: A process for recovering useful chemicals from spent alkaline cooking liquor of high sulfide content produced in the course of wood pulp manufacture. The spent cooking liquor is concentrated and the concentrate burned in a recovery furnace to produce a smelt comprising mainly $Na_2CO_3$ and $Na_2S$. Part or all of the $Na_2CO_3$ is separated from the smelt and reacted with $SO_2$ from the recovery furnace flue gases and, if desired, $SO_2$ from another source to produce $Na_2SO_3$. The $Na_2SO_3$ is burned in the recovery furnace with the concentrated cooking liquor where said $Na_2SO_3$ is converted to $Na_2S$. The resultant smelt has a high sulfide content and, when it is dissolved in water, an alkaline cooking liquor of high-sulfide content is regenerated.

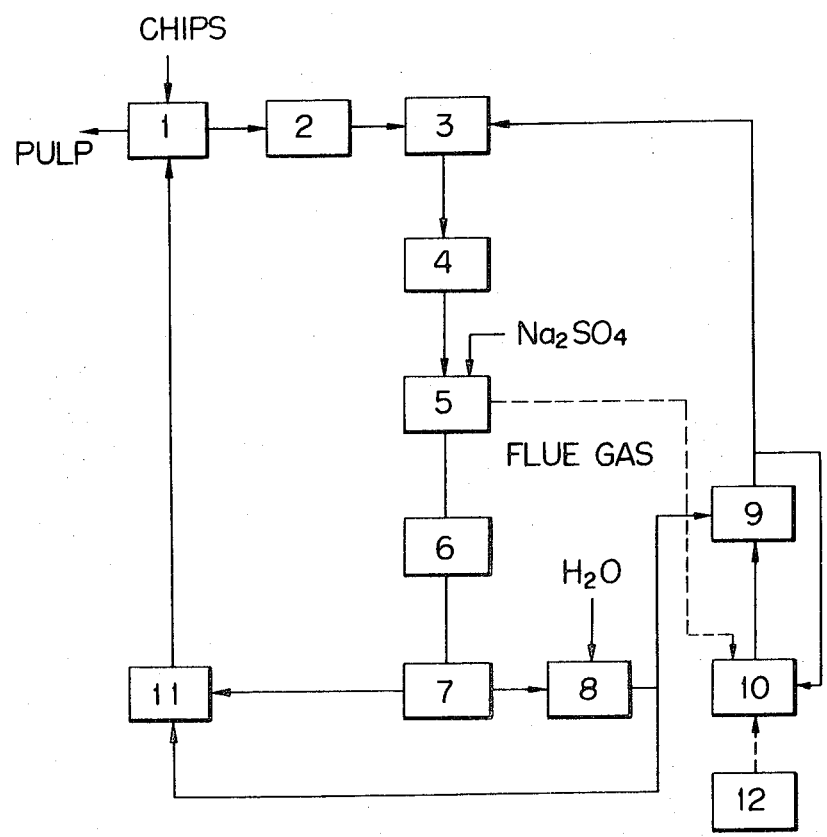

REGENERATION OF COOKING CHEMICALS FROM SPENT ALKALINE COOKING LIQUOR

The present invention relates to a method for recovering chemicals from spent cooking liquor produced in the course of wood pulp manufacturing processes and more particularly to a novel method for recovering cooking chemicals from alkaline spent cooking liquor having a high sulfide content mainly consisting of $Na_2S$ or $Na_2S$ and at least one of the group NaHS, NaOH and $Na_2CO_3$.

The chemical pulp manufacturing method may be divided broadly into two processes: an alkaline cooking process in which NaOH and $Na_2S$ are used as the main cooking chemicals and sulfite cooking processes in which sulfites such as $Na_2SO_3$ and $NaHSO_3$ are used as the main cooking chemicals. Most typical of the alkaline cooking process is the kraft process. The cooking chemicals used in the kraft process consist mainly of $Na_2S$ and NaOH which are present usually in amounts of 20 to 30 percent and 80 to 70 percent, respectively, and have a sulfide content of 20 to 30 percent.

This sulfide content is regulated by the chemical recovery method employed in the kraft process. Namely, in the kraft process, spent cooking liquor released from a digester is collected and concentrated, and then the organic materials dissolved out of wood during cooking and the inorganic materials added as cooking agents are burned in a recovery furnace and sodium and sulfur, which were contained in the cooking chemicals, are recovered in the form of a "smelt." In the smelt, sodium and sulfur are obtained in the form of $Na_2CO_3$ and $Na_2S$, respectively. $Na_2S$ and $Na_2CO_3$ obtained in the form of a smelt are then dissolved in water to form an aqueous smelt solution and then rendered alkaline to change $Na_2CO_3$ into NaOH to thereby regenerate liquid cooking chemicals consisting of $Na_2S$ and NaOH usable in the kraft process. Since small amounts of sodium and sulfur contained in the mixture are lost during the cooking and recovering steps, $Na_2SO_4$ is added in the recovery furnace to make up for the loss of said components. As is commonly known, most of the $N_2SO_4$ is reduced in the recovery furnace to come out in the form of $Na_2S$ in the smelt. The sulfide content of the kraft cooking liquor regenerated by adding such makeup chemicals as disclosed above is, at the highest 20 to 30 percent according to the presently available methods. When a sulfide content is above that level is required a specific treatment is necessitated. The primary reason that this sulfide content is limited within said range is that although the amounts of loss of sodium as $Na_2S$ and sulfur fractions during the cooking and recovering steps are substantially equal on a molar basis as is seen from the fact that the makeup chemical for such loss is $N_2SO_4$, the loss of sulfur is considerably larger than that of sodium. This loss of sulfur takes place either due to reaction with $Na_2O$ to form compounds such as $Na_2S$, $Na_2SO_4$ or $Na_2SO_3$, or in the form of gases not combined with $Na_2O$, such as $SO_2$, $H_2S$ or $CH_3SH$. The amount lost in these gaseous forms is several times as large as the amount lost due to reaction with $Na_2O$. Particularly loss of sulfur is mostly due to losses in the form of $SO_2$ gas from the recovery furnace. Therefore, to enhance the sulfide content of the regenerated cooking chemicals, it is necessary to reduce to a minimum the loss of sulfur. Particularly, it is extremely important to recover in some way or other said gaseous sulfur fractions and to fix them in the form of sodium sulfide.

The present invention is intended to make possible production of high-sulfide content alkaline cooking liquor by recovering and fixing said gaseous sulfur fractions in the form of $Na_2S$ and by enhancing the sulfide content of the smelt.

It is also possible to enhance the sulfide content according to a recovery method of the conventional kraft process by sharply reducing the collecting rate of spent cooking liquor and increasing the loss of sodium, with the consequent necessity to increase the amount of makeup $NA_2SO_4$. However, such a method is actually impractical because of extraordinary high cost resulting from an increase in the amount of the makeup chemicals.

Now, the discussion will be directed to the possible influence of sulfide content in alkaline cooking processes. The only prior method for alkaline cooking had been so-called "-soda" cooking in which NaOH alone was used as the active chemical, until the kraft recovery process was discovered. Nowadays, kraft cooking in which the above-said chemicals of 20 to 30 percent sulfide content are used, predominates. In alkaline cooking, as is known, lignin in wood undergoes alkaline hydrolysis and is dissolved in the cooking liquor, but when NaOH alone is present, condensation of lignin may take place. In the copresence of $Na_2S$, however, such recondensation is suppressed and elimination of lignin from the wood is promoted.

TABLE 1

Effect of Sulfide Content in Alkaline Cooking of Pinus Densiflora

| | | | | |
|---|---|---|---|---|
| Sulfide Content of cooking liquor | 10% | 30% | 50% | 100% |
| Permanganate number (25ml.) | 18 | 18 | 18 | 18 |
| Effective alkali charge (as % $Na_4O$) per O.D. chip) | 16 | 15 | 14 | 12 |
| Total yield (%) | 43.5 | 45.0 | 45.5 | 46.0 |
| Unbleached pulp viscosity (C.P.S.) | 17 | 25 | 30 | 36 |
| Cooking Conditions | | | | |
| Max temp. (°C.) | 170 | 170 | 170 | 170 |
| Time to max. temp. (min.) | 60 | 60 | 60 | 60 |
| Time at max. temp. (min.) | 90 | 90 | 90 | 90 |
| Liquor to wood ratio (l./kg-O.D. wood) | 4 | 4 | 4 | 4 |

In table 1 above are shown the results of studies conducted by the present inventors. When sulfide content is enhanced, desired delignification can be attained with addition of a small amount of effective alkali for the reasons described above. This results in reducing loss and damage during cooking of carbohydrates in wood, and pulp of high viscosity is obtained. Yield is also increased. It is extremely beneficial that such excellent products can be obtained from high-sulfide content alkaline cooking.

The present invention is intended to enable recovery of useful chemicals from spent liquor in high-sulfide content alkaline cooking. As mentioned above, according to the conventional kraft recovery method, it is impossible to regenerate cooking chemicals of high-sulfide content without increasing the amount of makeup $Na_2SO_4$, resulting in an economical disadvantage. The present invention oversteps the limit of sulfide content imposed intrinsically in the conventional kraft recovery method and provides quite a novel recovery process which permits regeneration of reusable cooking chemicals from spent liquor produced in high-sulfide content alkaline cooking.

The present invention comprises the steps of concentrating alkaline spent cooking liquor, burning same in a conventional recovery furnace, separating a part or all of the $Na_2CO_3$ in the resultant smelt, sulfiting this $Na_2CO_3$ with $SO_2$ gas in the flue gases and, if need be, with $SO_2$ gas from another source, circulating the resulting $Na_2SO_3$ to the recovery furnace, burning same with spent liquor in said furnace, fixing sulfur scattered from the furnace in the smelt to obtain a high-sulfide content smelt, and thereby regenerating alkaline cooking liquor of high-sulfide content. It is possible to regenerate alkaline cooking liquor of any desired sulfide content by changing the circulating amount of $Na_2CO_3$ in which $SO_2$ gas in said flue gases is absorbed.

Sodium and sulfur added as active chemicals in alkaline cooking are partly lost in the unbleached pulp washing step. Particularly, sulfur forms a small amount of volatile organic compounds such as $CH_3SH$ and is also lost during the cooking and unbleached pulp washing steps. However, most of the sodium and sulfur are recovered in collected spent cooking liquor. When spent liquor containing organic substances dissolved out of wood during cooking and also containing sodium and sulfur fractions derived from the cooking liquor is concentrated and burned in a recovery furnace, there is produced a smelt comprising $Na_2S$ and $Na_2CO_3$ as the principal ingredients. It is found that a change in the sulfide content of the cooking liquor in alkaline cooking produces a subsequent change in the smelt composition. But this relationship is not known with certainty because the structural configuration of the sodium and sulfur portions in spent liquor liquid is unclear and further, the reactions within the recovery furnace are not given any established elucidation except for some experimental rules about spent liquor in a kraft process where the sulfide content is limited within the range of 20 to 30 percent. Such a relationship is not completely known with respect to high sulfide content alkaline spent cooking liquor.

With a view to recovering chemicals from spent cooking liquor having a particularly high-sulfide content, the present inventors have conducted experimental studies on the sulfide content of the smelts obtained by burning spent liquor resulting from cooking at high-sulfide content. As a result, it was found that the higher the sulfide content of waste liquid (expressed as mole percent of the ratio $S/Na_2O$), the greater will be scattered sulfur fractions in gaseous form and the greater will be the difference between sulfide content of the smelt and that of spent liquor.

To cite an instance, it was found 40 if the sulfide content of spent liquor is 40 percent, 60 percent and 80 percent, the corresponding sulfide content of the smelt is respectively 35 percent, 51 percent and 61 percent.

In other words, sulfur in spent liquor is scattered, by an amount corresponding to the difference between the sulfide content of the spent liquor and that of the smelt, chiefly in the form of $SO_2$ gas into flue gases in the recovery furnace, so that smelt sulfide content is always smaller than that of spent liquor.

In high sulfide content alkaline cooking, the amount of sulfur scattered in the recovery furnace is so large that makeup of sulfur in the form of $Na_2SO_4$ on an amount sufficient to makeup for the loss of sodium is not sufficient to keep the smelt sulfide content high enough for high-sulfide content alkaline cooking. According to the present invention, a part or almost all of the $Na_2CO_3$ in the smelt is separated to enhance the sulfide content of the smelt while $SO_2$ gas scattered into the flue gases and, if need be, $SO_2$ gas from another source, is absorbed into this $Na_2CO_3$ and the resulting $Na_2SO_3$ returned to the recovery furnace so as to balance the proportion of sodium and sulfur contents in the recovery system and to thereby obtain a smelt of high-sulfide content.

It is not absolutely necessary to use $Na_2CO_3$ separated from said smelt for absorption of the sulfur in flue gases. A part of the aqueous smelt solution may be used for direct absorption of the sulfur in flue gases to attain substantially the same effect.

Now, the process for practising the present invention will be explained with reference to the accompanying drawing in which a flow sheet showing a mode of practice of the chemical recovery method is illustrated.

In the drawing, 1 designates a high-sulfide content alkaline cooking reactor. The spent liquor released from the cooking reactor 1 is forwarded through a spent liquor oxidizing means 2 to a mixing apparatus 3 where said liquor is mixed with $Na_2SO_3$ solution from a sulfiting apparatus 9. The spent liquor oxidizing means convert the sulfides in spent liquor by means of oxidation with oxygen into stable materials such as thiosulfate or polythiosulfate which prove useful to retard the generation of volatile sulfur compounds in the ensuing evaporating and concentrating step 4 and also to reduce corrosion of apparatus and to prevent the loss of sulfur components. The oxidizing means 2 may be arranged to come after the mixing apparatus 3. The mixed spent liquor is then forwarded to the spent liquor concentrating means 4 which may preferably comprise a combination of a spent liquor concentrating multieffect evaporator and a cascade evaporator which are preferably arranged so that said spent liquor is concentrated to about 50 to 55 percent solids in the multieffect evaporator and then further concentrated to about 65 percent solids in the cascade evaporator.

The concentrated spent liquor is then supplied to a spent liquor burning means, or a chemicals recovery furnace 5 where most of the sodium and sulfur contained in the spent liquor is formed into a smelt composed mainly of $Na_2S$ and $Na_2CO_3$. In this case, $Na_2SO_4$ is added in a suitable amount to the spent liquor supplied to the recovery furnace 5 to makeup for the loss of said components suffered during each step. This makeup chemical is not confined to $Na_2SO_4$; it may be $Na_2SO_3$ or the like. The smelt from the recovery furnace 5 is then guided into a smelt dissolving tank 6 where it is converted into a smelt solution. The concentration of this aqueous smelt solution, in consideration of heat economization in the ensuing crystallizing step, should be arranged to be as high as possible, preferably as close as possible to the saturation point of the smelt solution. The smelt solution is further advanced into a crystallizing means 7 where it is separated into a crystalline solid mainly composed of $Na_2CO_3$ and mother liquor mainly composed of $Na_2S$. Separated $Na_2CO_3$ is redissolved in a $Na_2CO_3$ dissolving tank 8. A part of this $Na_2CO_3$ solution goes to a causticizing step 11, with the rest going to a sulfiting means 9. The amount of $Na_2CO_3$ going to the causticizing step is determined according to the sulfide content of the alkaline cooking operation 1. In alkaline cooking where the degree of sulfide content is 100 percent, the amount of $Na_2CO_3$ going to the causticizing step 11 is zero. The remaining part of the $Na_2CO_3$ is led into a sulfiting means 9 where it is contacted with a mixed solution of $Na_2CO_3$ and $NaHSO_3$ from $SO_2$ gas absorbing means 10 and, while emitting $CO_2$ gas from a reaction shown by the following formula, is converted into $Na_2SO_3$ and returned to the mixing apparatus 3:

$$Na_2CO_3 + 2NaHSO_3 \rightarrow 2Na_2SO_3 + H_2O + OO_2 \quad (1)$$

In the $SO_2$ gas absorbing means 10, flue gas containing 1 to 0.3 vol. percent of $SO_2$ from the recovery furnace 5, and if additional $SO_2$ is required, $SO_2$ gas from a $SO_2$ gas generating apparatus 12, is contacted with the solution consisting mainly of $Na_2SO_3$ and nonreacted $Na_2CO_3$ from the sulfiting means 9 to thereby allow said solution to absorb $SO_2$ gas according to the following formula:

$$Na_2CO_3 + SO_2 \rightarrow Na_2SO_3 + CO_2 \quad (2)$$

$$Na_2SO_3 + SO_2 + H_2O \rightarrow 2NaHSO_3 \quad (3)$$

The mixture is then returned to the sulfiting means 9 to be used for sulfiting of $Na_2CO_3$. It should also be noted that an aqueous solution of $Na_2CO_3$ may be directly contacted with flue gas to sulfite it to thereby convert $Na_2CO_3$ into $Na_2SO_3$.

On the other hand, mother liquor deprived of crystals of $Na_2CO_3$ by a crystal separator of the crystallizing apparatus 7 and mainly composed of $Na_2S$ is mixed with a part of the $Na_2CO_3$ solution directly or in to causticizing apparatus 11 and after converting $Na_2CO_3$ in the mixture into NaOH, the mixture is brought back to the cooking equipment 1 as the high-sulfide content alkaline cooking liquor.

To illustrate in a more detailed manner, $Na_2CO_3$ which was separated from the smelt solution in said crystallizing apparatus 7 and then sulfide in the sulfiting apparatus 9 is brought back to the recovery furnace in the form of $Na_2SO_3$ which behaves in the same manner as $Na_2SO_4$ in the furnace and is converted mainly into $Na_2S$ obtained in the form of smelt. By selecting the amount of $Na_2CO_3$ thus sulfited and brought back to the recovery furnace, it is possible to adjust the sulfide content of the smelt. Thus by separating $Na_2CO_3$, in an amount corresponding to said circulating amount, from the smelt by the crystallizing apparatus, alkaline cooking liquor of 25 to 100 percent sulfide content can be obtained. The sulfide content of the resulting alkaline cooking liquor is enhanced in proportion to the amount of $Na_2CO_3$ to be circulated.

It should be noted that the instant invention is just described can also be applied to so-called cross recovery in which cooking chemicals are recovered from both alkaline spent cooking liquor and sulfite spent cooking liquor. In this case, sulfite cooking may be employed during the course where a part or most of the $Na_2CO_3$ in the smelt is converted into $Na_2SO_3$ in the sulfiting means 9 and then guided into the mixing apparatus 3. Namely, as will be understood from the reaction formula (1), (2) and (3) described above, by controlling the sulfiting rate by a conventional method, it is possible to prepare neutral sulfite semichemical cooking liquor comprising either $Na_2SO_3$ alone or a mixture of $Na_2SO_3$ and $Na_2CO_3$, or sulfite cooking liquor comprising one or a mixture of $Na_2SO_3$ $NaHSO_3$ and $H_2SO_3$. In this case, neutral sulfite semichemical or sulfite spent cooking liquor is delivered to the mixing apparatus 3 and thereafter treated according to the same steps as described above.

It is thus possible to easily regenerate sulfite cooking liquor and alkaline cooking liquor at the same time without requiring any additional step.

In the following will be shown some examples of the present invention.

Example 1

Alkaline spent cooking liquor of 100 percent sulfide content (pH=12.6, solid concentration = 21.5 Wt. percent, $S/Na_2O$ molar ratio in spent liquor = 0.85) and an aqueous solution of $Na_2SO_3$ (concentration = 18 Wt. percent) as the sodium component were mixed in the ratio of 4 :1 ($Na_2O$ molar ratio) and the mixture was concentrated to 55 wt. percent solids. This concentrated spent liquor was burned in an experimental combustion furnace. Resulting therefrom was a smelt having a composition comprising 61 Wt. percent of $Na_2S$, 31 Wt. percent of $Na_2CO_3$ and 8 Wt. percent of $Na_2SO_4$ and other materials.

This smelt was then dissolved in water and, after adjusting the resultant solution to contain 20 wt. percent solids, said solution was placed in a crystallizer where it was concentrated by evaporation at 60° C. to crystallize out most of the $Na_2CO_3$ in the form of $Na_2CO_3·H_2O$, which was then separated from the mother liquor by means of a centrifuge. Purity of the separated $Na_2CO_3$ crystals was 95 percent. The separated $Na_2CO_3$ was redissolved in water to produce a solution having 15 wt. percent solids, and the solution was then sent to the sulfiting step where it absorbed $SO_2$ gas in the flue gas from the recovery furnace and $Na_2SO_3$.

The $SO_2$ concentration in the flue gas was 0.4 vol. percent and the rate of absorption of $SO_2$ gas was approximately 90 percent. The pH of the aqueous $Na_2SO_3$ solution after absorption of $SO_2$ was about 7.8 while the concentration thereof was 18 wt. percent.

This $Na_2SO_3$ solution is mixed with alkaline cooking spent liquor.

On the other hand, the concentration of $Na_2S$ in the mother liquor obtained in the crystallizing step was about 20 wt. percent calculated as $Na_2S$ and about 4.6 wt. percent calculated as $Na_2CO_3$. This can be used as 100 percent sulfide content alkaline cooking liquor with no need for causticizing.

Example 2

Alkaline spent cooking liquor of 100 percent sulfide content and neutral sulfite semichemical spent liquor (pH=6.2, solid concentration = 4.8 wt. percent, $S/Na_2O$ molar ratio in spent liquor = 0.98) were mixed in the ratio of solids in the alkaline spent cooking liquor: solids in the neutral sulfite semichemical spent liquor = 3:1 (by weight) and the mixture was concentrated to 55 wt. percent in terms of solids. The pH of the mixed spent liquor was 10.5 to 11.0. As a result of the combustion of this concentrated spent liquor, there was obtained a composition comprising 50 wt. percent of $Na_2S$, 35 wt. percent of $Na_2CO_3$ and 15 wt. percent of $Na_2SO_4$ plus other materials.

Then, in the same manner as in example 1, the smelt was dissolved in water and $Na_2CO_3$ was crystallized under the same conditions as in example 1 and separated from the mother liquor. Thus obtained were crystallized $Na_2CO_3$ of about 95 percent purity and mother liquor containing mainly $Na_2S$.

Separated $Na_2CO_3$ was dissolved in water and then sulfited to obtain an aqueous solution of $Na_2SO_3$. The mother liquor is used as alkaline cooking liquor while aqueous $Na_2SO_3$ solution is used as neutral sulfite semichemical cooking liquor.

As explained above in detail, it is possible with the present invention to easily recover useful chemicals from high sulfide content alkaline spent cooking liquor, thus making it possible to practice high-sulfide content alkaline cooking on an industrial scale. Further, in plants where both alkaline cooking and sulfite cooking equipments are jointly provided, the present invention can also be employed to recover cooking chemicals from spent liquor released in both pulping process. Thus the present invention is extremely beneficial in industrial applications.

What is claimed is:

1. In a process for regenerating cooking chemicals from spent alkaline cooking liquor containing $Na_2S$ and $Na_2CO_3$ in which said spent alkaline cooking liquor is concentrated and the concentrated spent cooking liquor is burned in a recovery furnace to produce a smelt comprising $Na_2S$ and $Na_2CO_3$ and a flue gas containing $SO_2$, the improvement comprising:
   a. dissolving the smelt from a recovery furnace to form a smelt solution and crystallizing the smelt solution to form solid $Na_2CO_3$ and a mother liquor mainly composed of $Na_2S$, and separating the mother liquor from substantially all of the $Na_2CO_3$;
   b. redissolving the solid $Na_2CO_3$ in water, and contacting $SO_2$ from the flue gas therewith to convert said $Na_2CO_3$ solution to a $Na_2SO_3$ solution;
   c. recycling the resultant $Na_2SO_3$ solution to fresh concentrated spent cooking liquor to form a mixed solution prior to any burning thereof in said recovery furnace; and
   d. burning the resultant mixed solution in said recovery furnace whereby $Na_2SO_3$ contained therein is converted to $Na_2S$ to be used in cooking liquor.

2. In a process for regenerating cooking chemicals from spent alkaline cooking liquor containing $Na_2S$ and $Na_2CO_3$ in which said spent alkaline cooking liquor is concentrated and the concentrated spent cooking liquor is burned in a recovery furnace to produce a smelt comprising $Na_2S$ and $Na_2CO_3$ and a flue gas containing $SO_2$, the improvement comprising:
   a. dissolving the smelt in water and contacting $SO_2$ from the flue gas therewith to convert the $Na_2CO_3$ contained therein to $Na_2SO_3$ to form a solution containing $Na_2SO_3$ and $Na_2S$;
   b. recycling the resultant solution from (a) to fresh concentrated spent cooking liquor prior to the burning thereof in said recovery furnace; and
   c. burning the resultant mixed solution in said recovery furnace whereby $Na_2SO_3$ contained therein is converted to $Na_2S$ to be used in cooking liquor.

3. The process of claim 1 wherein the $Na_2SO_3$ solution is used in a sulfite cooking process prior to being added to concentrated spent cooking liquor and burned in the recovery furnace.

4. The process of claim 1 wherein the spent alkaline cooking liquor contains in addition to $Na_2S$ and $Na_2CO_3$ at least one member of the group consisting of NaOH and NaHS.

* * * * *